United States Patent [19]

Knopp

[11] Patent Number: 5,671,431
[45] Date of Patent: Sep. 23, 1997

[54] METHOD FOR PROCESSING USER PROGRAM ON A PARALLEL COMPUTER SYSTEM BY INSERTING A TAG DURING COMPILING

[75] Inventor: Jürgen Knopp, Ottobrunn, Germany

[73] Assignee: Siemens Aktiengesellschaft, Munich, Germany

[21] Appl. No.: 406,893

[22] PCT Filed: Aug. 18, 1993

[86] PCT No.: PCT/DE93/00744

§ 371 Date: May 10, 1995

§ 102(e) Date: May 10, 1995

[87] PCT Pub. No.: WO94/07197

PCT Pub. Date: Mar. 31, 1994

[30] Foreign Application Priority Data

Sep. 22, 1992 [DE] Germany ............ 42 31 709.6

[51] Int. Cl.⁶ .................................................. G06F 13/00
[52] U.S. Cl. .................... 395/800; 395/706; 395/705; 395/392; 395/580
[58] Field of Search ............ 395/800, 670, 395/672, 674, 675, 676, 375, 650, 700, 706, 705, 392, 580

[56] References Cited

U.S. PATENT DOCUMENTS

| | | | |
|---|---|---|---|
| 5,119,495 | 6/1992 | King | 395/700 |
| 5,247,696 | 9/1993 | Booth | 395/800 |
| 5,303,356 | 4/1994 | Vassiliadis et al. | 395/585 |
| 5,355,460 | 10/1994 | Eickemeyer et al. | 395/391 |
| 5,367,678 | 11/1994 | Lee | 395/650 |
| 5,465,377 | 11/1995 | Blaner et al. | 393/800 |
| 5,500,942 | 3/1996 | Eickemeyer et al. | 395/386 |
| 5,560,028 | 9/1996 | Sachs et al. | 395/800 |

FOREIGN PATENT DOCUMENTS 40 18 012  12/1991  Germany.
WO 91/19251  12/1991  WIPO.

OTHER PUBLICATIONS

"Parallel Processing Of Near Fine Grain Tasks Using Static Scheduling On Oscar" (Optimally Scheduled Advanced Multiprocessor), Hironori Kashara et al, Proceedings Supercomputing, 12 Nov. 1990, pp. 856–864.

"Programming Language Concepts For Multiprocessors", Harry F. Jordan, Parallel Computing, vol. 8, No. 1–3, Oct. 1988, pp. 31–40.

Primary Examiner—Meng-Ai T. An
Attorney, Agent, or Firm—Hill, Steadman & Simpson

[57] ABSTRACT

In the execution of an application program on different computers of a parallel-computer system, the problem is encountered that a process running on the one computer requires a data item which is generated by another computer in a parallel-running process. To avoid having to determine during the running of the program for each instruction containing an access to a data item whether this data item is determined in a parallel process, the commands which give access to a data item which either has already been calculated in the current process or is present at the time of access in an already calculated form in a parallel process are tagged during compiling of the application program. The execution of these commands is carried out in the same way as in the sequential case.

4 Claims, 4 Drawing Sheets

FIG.3

| Sample program | Context | Symbol table (before after) | | self |
|---|---|---|---|---|
| let (X=X-init-value, | L,R-nonderef | | X->? | |
| Y=Y-init-value) | L,R-nonderef | X->? | X->?,Y->$ | |
| 2   X:=1 | L,R-nonderef | X->?,Y->$ | X->$,Y->$ | |
| 3   Y:= F(X); | L,R-nonderef | X->$,Y->$ | X->$,Y->? | |
| 4   if | deref | X->$,Y->? | unchanged | $ |
| (X ==4) | L,R-deref | X->$,Y->? | unchanged | L-$,R-$ |
| 5   then | nonderef | X->$,Y->? | unchanged | |
| print(Y) | deref | X->$,Y->! | unchanged | |
| else | nonderef | X->$,Y->! | unchanged | |
| 6   Y:=1; | nonderef | X->$,Y->! | X->$,Y->$ | |
| endif | ;here the branches of the if are brought together therefore the symbol table changes: | | | |
| 7   print(X) | deref | X->$,Y->! | unchanged | $ |
| 8   print(Y); | deref | X->$,Y->! | unchanged | ! |
| 9a  Y:= | L,R-nonderef | | | |
| 9b      X+3; | L,R-deref | X->$,Y->! | unverandert | L-$,R-$ |
| ;after instruction 9 the symbol table changes: | | | | |
| 10  if | deref | X->$,Y->$ | unchanged | $ |
| (X ==Y) | L,R-deref | X->$,Y->$ | unchanged | L-$,R-$ |
| 11  then | nonderef | X->$,Y->$ | unchanged | |
| print(Y) | deref | X->$,Y->$ | unchanged | $ |
| 12  else | nonderef | X->$,Y->$ | unchanged | |
| print(X) | deref | X->$,Y->$ | unchanged | $ |
| endif | | | | |
| endlet | | | | |

FIG.4

```
let  (X=X-init-value Y=Y-init-value)
   X:=1;Y:=F(X)  X:=1;Y:=F(X);
     if (X$==4)$then print(Y)else Y:=1 endif
   print(X$)print(Y!);Y:=X$+3$;
     if (X$==Y$)$then print(Y$)else print(X$)endif
endlet
```

FIG.5

ANA : ARG-CODExCONTEXTxARG-SYMB ->
    RES-CODExSELF-PROPxRES-SYMB

FIG.6

ANA (LEFT+RIGHT,CONTEXT,SYMB)=
    (N-LEFT,L-PROP,L-SYMB)=ANA(LEFT,deref,SYMB);
    (N-RIGHT,L-PROP,L-SYMB)=ANA(RIGHT,deref,SYMB);
Result: (mark-prop(N-LEFT+N-RIGHT,present),present,R-SYMB)

FIG.7

ANA (CONS(LEFT,RIGHT),CONTEXT,SYMB)=
    (N-LEFT,L-PROP,L-SYMB)=ANA(LEFT,nonderef,SYMB);
    (N-RIGHT,L-PROP,L-SYMB)=ANA(RIGHT,nonderef,SYMB);
Result: (mark-prop (CONS(N-LEFT,N-RIGHT,present),present),R-SYMB)

FIG.8

ANA (LET X=VALUE IN BODY,CONTEXT,SYMB)=
    (N-VALUE,V-PROP,VALUE-SYMB)=ANA(VALUE,nonderef,SYMB);
    NEU-SYMB=enter the pair(X, V-PROP) in VALUE-SYMB;
    (NEU-BODY,RES-PROP,N-N-SYMB)=ANA(BODY,CONTEXT,NEU-SYMB)
Result:(LETX=N-VALUE IN NEU-BODY,RES-PROP,cut-top-level(N-N-SYMB)

FIG.9

ANA (X:=Y,CONTEXT,SYMB)=
    (NEW-Y,RES-PROP,NEW-SYMB)=ANA (Y,CONTEXT,SYMB)
Result: (X:=NEW-Y,RES-PROP,NEW-SYMB [X/RES-PROP])

FIG.10

ANA(IF BED THEN THEN-CLAUSE ELSE ELSE-CLAUSE,CONTEXT, SYMB)=
    (N-BED,BED-PROP,B-SYMB)=ANA(BED,deref,SYMB);
    (N-THEN,THEN-PROP,T-SYMB)=ANA(THEN-CLAUSE,CONTEXT, B-SYMB);
    (N-ELSE,ELSE-PROP,E-SYMB)=ANA(ELSE-CLAUSE,CONTEXT, B-SYMB);
    RES-PROP=prop-cut (THEN-PROP,ELSE-PROP);
    RES-SYMB=symb-cut (T-SYMB,E-SYMB);
Result:(IF N-BED THEN N-THEN ELSE N-ELSE,RES-PROP,RES-SYMB))

FIG.11

ANA(VAR,CONTEXT,SYMB)=
    IF(CONTEXT==deref) THEN
        NEW-SYMB=make-determined(VAR,SYMB);
        RES-PROP=determined
    ELSE
        NEW-SYMB=SYMB;
        RES-PROP=SYMB[VAR]
    END
    RES-CODE=mark-prop(VAR,RES-PROP)
Result:(RES-CODE,RES-PROP,NEW-SYMB)

FIG.12

ANA-F: ARGUMENT-PROP->ARGUMENT-PROPxRES-PROP

FIG.13 let (X=X-init-value Y=Y-init-value)
  X:=1;Y:=F(X)X:=1;Y:=F(X);
  if(X$==4)$thenY:=WAIT(Y); print(Y$)else Y:=1 endif
  print(X$); print(Y$);Y:=X$+3$;
  if(X$==Y$)$then print(Y$)else print(X$)endif
endlet

METHOD FOR PROCESSING USER PROGRAM ON A PARALLEL COMPUTER SYSTEM BY INSERTING A TAG DURING COMPILING

BACKGROUND OF THE INVENTION

The development of new, faster von Neumann computers is being increasingly hindered by the fact that the physical limits of the technology used are being reached. There is no prospect of a further increase in performance similar to that of recent decades. Parallel computers alleviate this problem by a number of processors being used for the execution of an application program. However, the provision of parallel computers is not enough in itself. Very few application programs can be automatically parallelized in a simple way. In any event, instructions or constructs which permit the explicit formulation of parallelism are necessary.

In past years, a large number of different programming-language constructs which permit the expression of parallelism have been devised for parallel programming. However, this cannot get around the problem that every parallelism entails management between the processors involved. Therefore, it must generally be accepted that each parallelized program must in the first instance accept losses in speed with respect to one processor: this is so since programs run slower in a parallel environment on a single processor than in sequential environments, even if no communication takes place between the processors. The management of potential parallelism alone costs additional resources. Therefore, part of the speeding up of program processing achieved by parallelism is lost again.

This problem is further explained with reference to FIG. 1 and FIG. 2.

On normal sequential von Neumann computers, all the data DA are held in memory locations SP of the main memory ASP. Consequently, data required during the running of the program can be accessed directly (FIG. 1).

On the other hand, at the run time of programs to be processed in parallel, often data are calculated in parallel. Therefore, data do not take the form shown in the sequential case, instead there are more complicated structures (FIG. 2). A memory location SP1 then contains an identifier KN, which indicates whether a normal data item (sequential case) or a data item to be calculated in parallel is present, and possibly further information on whether and where the data item is to be found. The parallel evaluation is characterized in that it is not known whether data are already calculated or not. While this characteristic arises in the case of sequential programs from the running of the program, in the parallel case there is a more complicated situation. The data item could have to be calculated in a process running on another processor or not. If the first case applies, this data item may or may not have already been calculated in the parallel process. FIG. 2 shows these conditions. Case 2 corresponds in fact to the case of FIG. 1 and differs only in that the program requires different storage of the data item because of possible parallel execution. The data item DA is in this case linked with an identifier KN, which indicates that this data item is calculated sequentially or normally. Such a data item is to be referred to in the following as "present" and be provided in abbreviated form in the code with a $ sign. Case 1), on the other hand, deals with the case where there is parallel processing of processes of the application program. Here, again, there is provided per memory location the identifier KN, which now indicates that the data item is determined in a parallel-running process. Instead of the data item, now a dummy PL is provided, which indicates where the data item DA is in the memory ASP. In case 1.1, the data item DA is already to have been calculated when access to this data item takes place. This case is referred to in the following as "determined" and is to be identified in abbreviated form in the code by an exclamation mark (!). In case 1.2, on the other hand, the dummy PL refers to a memory location SP2, which at the time of access to the data item is still empty, which means that this data item has not yet been calculated in the parallel-running process. This case is to be referred to in the following as "undetermined" or "unknown" and be provided in abbreviated form in the code with "?".

The problematical situation described in the case of the parallel calculation of processes of a program is described in more detail in the PCT application with the publication number WO 91/19251.

In parallelism models it is possible that, for any given instructions, apart from the simple case 2 of FIG. 2, one of cases 1.1 or 1.2 of FIG. 2 may exist. Thus, with each access it must be investigated whether the instruction really requires this data item during execution. Art access which really requires a data item is to be referred to in the following as "dereferencing" access (abbreviated to deref). In the case of dereferencing accesses, it must always be borne in mind that data may be accessed indirectly (case 1.1) or directly (case 2) and that data which have not yet been calculated must not be accessed (case 1.2). Consequently, when executing the program, in the case of instructions which access a data item it must always be checked a) whether a normal data item (case 2) or a data item to be calculated in parallel (case 1) exists (present test), b) if appropriate, whether the data item in case 1 has already been calculated (determined test).

If the data item has already been calculated, the data item can be accessed (case 1.1). If this is not the case (case 1.2), the system must wait for calculation of the data item and only then can it proceed as in case 1.1. Because of this waiting, in the following we speak of implicit synchronization.

SUMMARY OF THE INVENTION

The problem underlying the invention is that of specifying a method by which it can be established already during the compiling of the application program to be processed for which instructions test a or b can be omitted. This problem is solved according to the invention a method of processing an application program on a parallel-computer system, in which the individual processes are processed on different computers the code of the application program is read in. During compiling of the application program, it is established for each instruction, on the basis of a list in which it is specified whether the execution of an instruction requires an access to a data item (dereferencing) or not, whether its execution requires an access to a data item. It is entered as a characteristic for these instructions in a symbol table whether their variable; (1) has already been written in the current process (present), (2) can be executed in parallel and has already been calculated if the current process requires the variable (determined), (3) can be executed in parallel and possibly has not yet been calculated if the current process requires the variable (unknown).

In the compiled program, the instructions for which case (1) applies are provided with a first tagging sign, on the other hand the instructions for which case (3) applied are provided with a second tagging sign.

The result of an executed instruction is tagged according to its characteristics and the result variable is entered with its characteristics in the symbol table.

Consequently, it is established during compiling in which category the individual instructions of the program are to be classified and the instructions whose access leads to a data item which is present (case 2) or indeed determined (case 1.1) are tagged. For these two cases, it is then no longer necessary for a present test or a determined test to be carried out. Only in case 1.2 is it necessary to proceed as until now has generally been the case, i.e. the present test and the determined test have to be carried out and the system has to wait for calculation of the data item.

It is advantageous if all the instructions of a programming language are specified in a list with their context, which indicates whether the execution of this instruction includes an access which requires a data item (dereferencing) or does not require a data item (non-dereferencing). On the basis of this list, the context in which the instruction is located can then be established during compiling.

Furthermore, during compiling of the program, the variables contained in the instructions are assigned their characteristic, that is to say whether they are present, determined or unknown. As a rule, this can be established if the individual variables are included in a symbol table at the time of their occurrence and it is additionally indicated there which characteristic each variable has. These characteristics may of course change with the program run. Consequently, the table contains the prehistory for each variable, which can be used at the time of the investigation of an instruction.

Instructions which represent branch commands are expediently handled such that the characteristics of the variables are established for each branch and entered in the symbol table and then the branch whose variable characteristics are the most unfavorable is used for the assessment.

If an instruction includes a recursion, it is expedient to set out from the starting characteristic of present and dereferencing and to carry out the recursion until the characteristics of the variables no longer change.

For loops, the characteristics resulting from the symbol table are taken as the starting basis and the passes are repeated until the characteristics of the variables no longer change.

It is particularly advantageous if all the variables which have the characteristic determined are assigned the characteristic present and for this purpose there is additionally inserted an instruction which stops the execution of this instruction until the variable is determined.

Other further developments of the invention, are as follows.

For branching commands the characteristic of the results is established for each branch and is entered in the symbol table, in which the result and the symbol table of the branch whose characteristics are the most unfavorable are chosen as the result of the branching command.

In the case of a recursion instruction or a loop instruction, the starting characteristic present and dereferencing is taken as the basis and the function is iteratively analyzed until the characteristics no longer change.

All the variables which have the characteristic determined are assigned the characteristic present and for this purpose there is additionally inserted an instruction which stops the execution of the instruction until the variable is determined.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows a section of a program written in pseudo-code for easier understanding, FIG. 4 represents the same program with tagging signs corresponding to the method, FIGS. 5, 6, 7, 8, 9, 10, 11, 12 and 13 show examples of the way in which the method according to the invention investigates individual instructions or constructs.

DESCRIPTION OF THE PREFERRED EMBODIMENTS

Figure 1:
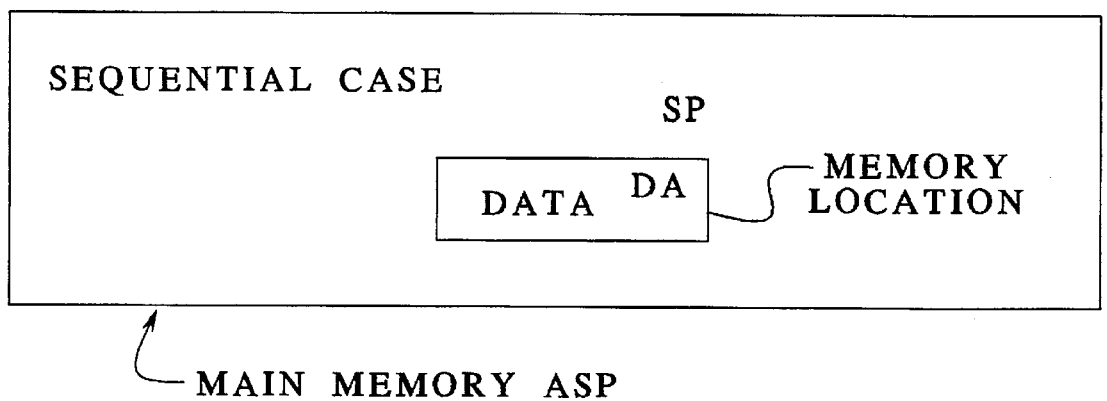
FIG. 1 shows data held in memory on a prior art sequential computer.

In most languages with implicit synchronization, it is necessary to define the semantics of the basic operations (constructs or instructions) with respect to this synchronization. This can take place with the aid of a list in which these characteristics are contained. For example, the following definitions may apply:

The instructions are qualified with respect to each of their arguments as follows:

the argument is always required in dereferencing form;
the argument is sometimes required in dereferencing form;
the argument is not required in dereferencing form by this instruction.

These predefined instructions are qualified with respect to each of their results, there being instructions or functions with a number of results:

the result is always an already calculated value;
the result is not always an already calculated value.

The characteristic of each instruction as to whether its argument is required in dereferencing form or nondereferencing form can be collated in a list and used later during compiling.

The characteristics of the results of the instructions depend not only on the qualification of the arguments as dereferencing or nondereferencing but also on which characteristics the variables used have, whether they are present, determined or unknown. These characteristics of the variables can be collated in a so-called symbol table.

The method can be best explained with the aid of the program section of FIG. 3. There, a number of typical instructions have been formulated in pseudo-code and it is further indicated in which context these instructions occur. It is specified in a symbol table which characteristic the variables occurring have. In addition, it is indicated under self at which locations of the program code they are to be tagged.

In the symbol table, the characteristics before and after the execution of the instruction (before—after) are indicated. The assignment of context relates to the respective substructure. If this has two components (for example (x=4)), we speak of L or R context, if only one component exists (print (Y)), we simply speak of context. In addition, the self-value of the corresponding substructive(s) is indicated. From this we obtain the locations at which the target program is to be tagged. Here too, L and R are used to refer to the left-hand substructure and right-hand substructure, respectively. It must be borne in mind that the self characteristic is of significance only at dereferencing locations. Only here does a test for present take place at the run time, so only here is there something to suppress.

For the values X-init-value and Y-init-value, let it be assumed that X-init-value is unknown (?) and Y-init-value is present ($).

In the program section of FIG. 3, only two variables X, Y occur, they are inserted with the first command and included in the symbol table. With the instruction 2, the variable X is assigned a 1, accordingly the characteristic present is included in the symbol table for X. The context of the instruction 2 is clear and need not be explained any further.

The content of the instruction 3 is that Y is to be calculated as a function of X. Since the function F is unknown, at this time the variable Y is unknown; this is entered in the symbol table. Since F is not known, it is assumed that it is non-dereferencing (sure approximation).

The lines 4 to 6 of the program comprise an if . . . then . . . else . . . instruction. Command 4 of the instruction, which contains the condition which is to be checked, is dereferencing in context, the used variable X is present, as the symbol table reveals, thus the condition can be checked. In command 5 of the instruction, Y is to be printed if the condition is satisfied. Since Y is unknown, this command cannot be executed until Y has been calculated according to instruction 3. The system has to wait for this. This means that, when this command is executed, the variable Y must be determined. If the condition according to command 4 is not satisfied, command 6 must be executed and consequently the variable Y will be made equal to 1 and would be present.

The instruction 7, which provides a print command for the variable X, is dereferencing in context, since printing can only be carried out if the variable X is present, which is possible since the variable is present.

Instruction 8 provides a print command for the variable Y. This instruction is likewise dereferencing and can also be executed, since Y must have at least the characteristic determined. This is so since either command 5 has already been executed at the time of the print command 8 or the assignment of command 6 has taken place.

Instruction 9a, 9b represents an arithmetic operation, namely an addition. The context of an arithmetic operation is always dereferencing. The instruction can be executed, since X is present. Consequently, Y is also present and is correspondingly designated in the symbol table.

Instruction 10 to 12 is in turn an if instruction and is treated in the way corresponding to instruction 4 to 6. The context of the commands of the instruction is dereferencing; since the variables are present, the commands can also be executed immediately. This does not cause the characteristics of the variables to change, so that no change has to be entered in the symbol table for the variables.

Consequently, FIG. 3 discloses how the characteristics of the variables used in the program are entered in the symbol table upon the first assignment and how these characteristics of the variables are then used later in the case of other instructions and can thereby change in their characteristic. For the variables of each instruction there is thus a prehistory, which is contained in the symbol table. The context of the instructions arises from the function which the instruction represents, and can be defined in a list.

FIG. 4 then shows the program section according to FIG. 3 with tagging of the characteristics of the variables. If the characteristic of a variable is present, a $ sign is set behind the variable; if the characteristic of a variable is determined, an ! is set behind this variable. If the characteristic of a variable is unknown, this variable is not tagged. In addition, the result of an instruction is tagged in a corresponding way.

This is disclosed, for example, by cord 4 or 9. If the instructions of a program are tagged in this way, it can be established during the program run whether in the case of an instruction with access to a data item this data item can be addressed directly or can be addressed via a dummy and is present or has to be addressed via a dummy and is not present. Correspondingly, the tests specified above can be omitted if the access leads to a data item which is present, while access to a data item which is determined no longer requires that the system has to wait for the data item.

If in addition, in the case of all instructions which access a data item which is determined, this data item is assigned the characteristic present, i.e. the dummy is overwritten by the data item, no tests are required any longer for this case either.

The method according to the invention is to be treated more abstractly in the following, not specific to any one application. For this purpose, a number of typical instructions from the programming language are investigated.

FIG. 5 shows quite generally which analysis has to be carried out in order to establish whether the result of an instruction has to be tagged or does not have to be tagged. Necessary for this purpose is an investigation of the argument of the code of the instruction, the context in which the instruction is to be found and the characteristics of the argument of the instruction. This is represented in the left-hand expression of the analysis function ANA in the pseudo-code. The result of the investigation produces a result code (RES-Code), which is either tagged or not tagged; furthermore, a result symbol table (RES-Symb) is produced, in which the change of a characteristic of the result variable arising due to the execution of the instruction is entered and, in addition, the characteristic of the result which is expressed in the tagging of the code is once again given for use in the analysis of the synoptic context, to be precise under the designation self-prop.

First of all an instruction in which an arithmetic operation is to be executed is to be investigated (FIG. 6). The arithmetic operation is in this case to combine two operands left, right with each other. With the aid of the analysis function, both the two operands and the result are then investigated recursively. The investigation of the left-hand operand left (now referred to as n-left) reveals that this operand has the context dereferencing and that the characteristic of the operand is revealed by the symbol table SYMB, that is to say from the prehistory of these variables. This is represented in the second line of FIG. 6. Next, the right-hand operand right is investigated. It goes without saying that this operand is also dereferencing in context and the characteristic is revealed by the symbol table, as it exists after the investigation of the left operand. For this reason, it is referred to here as L-SYMB. The result reveals that the instruction n-Left+n-Right must always have the characteristic present and consequently is to be tagged in the code by a $. The characteristic of the result is defined by the characteristic which emerges from the execution of the operation. In the event that the characteristics of the operands left and right are neither determined nor present, they are not tagged. This would mean that the system has to wait with execution of the operation until the operands are at least determined. Nevertheless, the result of the operation is always present, since a new value is always generated if the operands are determined.

FIG. 7 is concerned with the investigation of the function Cons, by which lists are formed. It builds up a list, the components of which are the two arguments of Cons. Since the effective values of the arguments are insignificant for list formation, recursive calls, which are in nondereferencing context, take place here. Here too, the characteristics of the arguments are revealed by the symbol table at the time of the investigation of the components of the instruction. That is to say that the symbol table is constantly kept up to date. The result is present in the case of the instruction Cons, i.e. a list node is generated immediately (the list elements themselves may in this case still be uncalculated).

FIG. 8 is concerned with the LET instruction. As the program of FIG. 3 shows, for example, the initial value does not yet have to be present for the LET command to occur, i.e. "VALUE" is in the context non-deref. The characteristic of VALUE arises from the analysis of VALUE. As FIG. 3 furthermore reveals, the variable X is now entered in the new symbol table. Its characteristics are identical to the characteristics of VALUE. Any new-SYMB is passed on to Body, that is to say the program area between LET and END-LET. The context of Body is identical to the context of the entire LET instruction. The result characteristic of LET is identical to the result characteristic of Body. The resulting symbol table is the symbol table calculated in Body, the new entry of X being removed (Cut-Top-Level) because X is not visible outside this LET clause 1. The conditions explained are revealed by FIG. 8.

FIG. 9 shows the case of assignment. Here, the variable Y is assigned to the variables X. The variable X inherits all the characteristics of Y. The characteristics of Y remain unchanged and are revealed by the prehistory. The result characteristic of this instruction is identical to the characteristic of the right-hand side, since the result value of an assignment is always identical to the value which is assigned. The notation new-SYMB (X/RES-PROP) means that the characteristic of RES-PROP is entered in the symbol table new-SYMB under X.

FIG. 10 is concerned with the if-then-else instruction. The defined characteristics with regard to dereferencing become clear from this instruction. The condition BED is always required in execution: if is dereferencing in its first argument, thus the constant context deref is transferred in the call-up of the analysis function ANA. The two case-differentiating branches inherit the context of the overall case differentiation. Obtained as the evaluation sequence is first of all an execution of the condition, then an execution of the two branches. Since the condition is not known, it is assumed that both case differentiation branches have to be executed and the results used for a conservative approximation: RES-PROP is defined by a cut of the characteristics of the two branches, it consequently is given as a value the inferior characteristic. Analogously, the symbol table is calculated by a cut: the inferior value in each case is assumed for all entries.

The same pattern of conservative approximation is also applied in the case of other instructions. If it is not known whether or how often a (partial) construct is passed through, all possibilities are taken into consideration and a conservative approximation made by forming a cut. For example, loops are handled in this way: the loop is passed through several times, the new end conditions and end symbol tables being cut with the previous ones. As soon as nothing more changes, an approximation has taken place over a random number of loop passes. The randomly identifiable characteristics of the loop have been determined.

It is explained with reference to the example of FIG. 11 how the characteristics of variables can change without taking on a new value. For example, the following instruction is investigated: Y=IF VARTHEN VAR+1 ELSE VAR. The variable VAR is required in dereferencing form in the condition.

It emerges from this that, when the variable is used in addition, it can be assumed that VAR is at least determined. In this example, this characteristic is even passed on to Y. This gives rise to the general analysis function for a variable according to FIG. 11. If VAR was previously not determined, the symbol table has to be changed. It must be borne in mind that dereferencing access does not cause the variable to be present, but determined.

The analysis of individual user-defined functions is helpful for the analysis of other user-defined functions which they call up. For example, for every single-variable, single-value function F: f→y, a function ANA—F according to FIG. 12 is generated. Setting out from the original characteristic of the function argument as a basis, the characteristic which the argument and the result of the function call-up has after this call-up is calculated. For a function with more arguments and more results, the same applies correspondingly. As soon as the source code of a called-up function is not accessible during the analysis of a function, a pessimistic approximation is carried out: the call-up of such a function destroys all the characteristics of the calling-up location.

Recursive functions are handled analogously to loops: Setting out from initial characteristics for the recursive function call-ups as a basis, the function body is analyzed. This procedure is iterated: setting out from the newly calculated characteristics of the function as a basis, the body is again analyzed, new characteristics being determined. As soon as the characteristics no longer change, the procedure can be terminated. What is important here is to choose the correct initial characteristics. Unlike at all other points in the analysis, optimistic approximation is to be carried out here: the starting characteristics state that all the arguments of the recursive function are dereferenced and that all the results are present.

Figure 2:
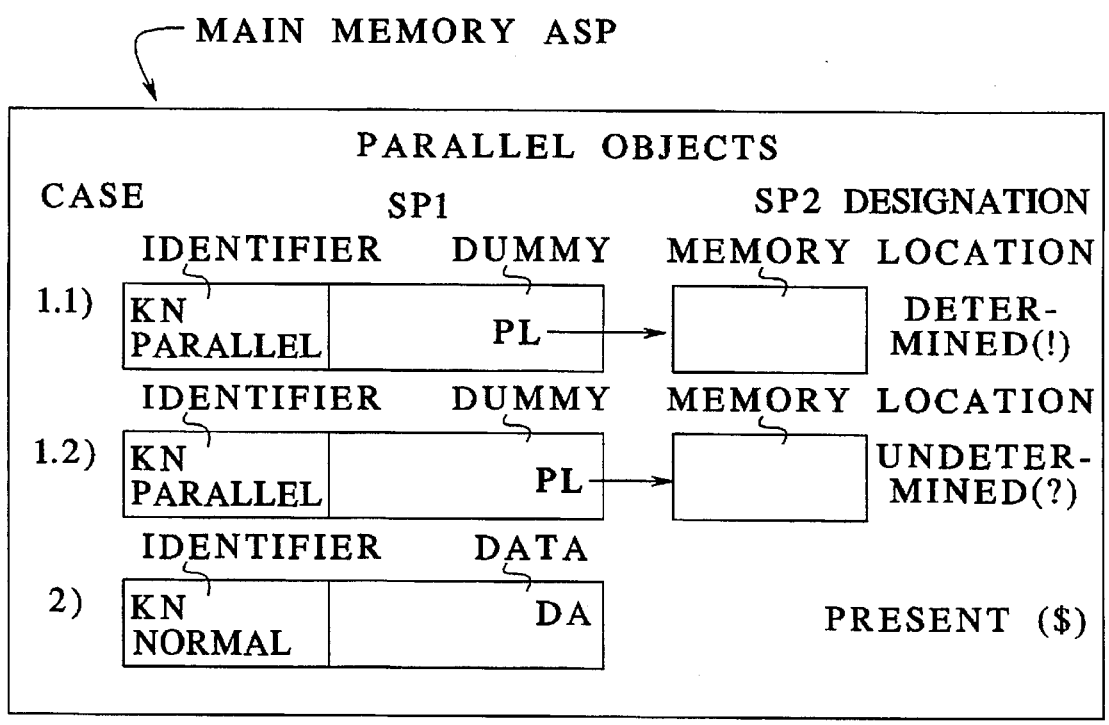
FIG. 2 shows data held in memory on a parallel processing computer.

Dereferencing accesses cause variables to obtain the characteristic determined. Better results could be accomplished, however, if the variables were present. This can be achieved without resulting in disadvantages. The method must be amended such that, as soon as a variable is determined, it is overwritten by its own value. Consequently, case 1.1 is replaced by case 2 (FIG. 2). Since the present characteristic is now available, no test at all is required any longer in all further dereferencing uses of the corresponding variables. The same applies to all further variables which inherit this characteristic. FIG. 13 shows an example.

The advantage of the method according to the invention is that dynamic checks which have to take place at the run time of parallel programs are eliminated. It is established by a random analysis of the program at which locations such checks do not have to take place because it is evident from the flow of the program what the result of the check is. Important for this is that the basic constructs or instructions are qualified with regard to the characteristic dereferencing, sometimes dereferencing, never dereferencing;

that the variables and (partial) expressions are qualified according to their characteristics present, determined or unknown by abstract interpretation of the program. The result of the analysis is a transformed program from which it is evident where tests can be omitted, that variables which are determined are overwritten by their own value, so that they become present. Consequently, the analysis results are decisively improved, without the significance of the program changing, that the use of analysis results of individual functions can be called upon for the analysis of other functions;

and the handling of recursion takes place by iteration on the basis of an optimistic approximation. The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claim is:

1. A method of processing an application program on a parallel-computer system, comprising the steps of:
   a) processing individual processes on different computers in the parallel-computer system,
   b) reading in code of the application program,
   c) establishing, during compiling of the application program, for each instruction, based on a list in which is specified when execution of an instruction requires an access to a data item, if execution thereof requires an access to a data item,
   d) entering as characteristic information for these instructions in a symbol table whether data
      d1) has already been written in a current process,
      d2) can be executed in parallel and has already been calculated if the current process requires the data,
      d3) can be executed in parallel and possibly has not yet been calculated if the current process requires the data,
   e) providing, in the compiled program, instructions for which case d1) applies with a first tagging sign, and instructions for which case d3) applies with a second tagging sign,
   f) tagging a result of an executed instruction according to characteristic information thereof and entering a result variable with the characteristic information in the symbol table.

2. The method as claimed in claim 1, wherein, for branching commands, the characteristic of a result is established for each branch of the branching commands and is entered in the symbol table, wherein the result and the symbol table of a branch whose characteristics are most unfavorable for parallel executing are chosen as a result of the branching command.

3. The method as claimed in claim 1, wherein, for a recursion instruction or a loop instruction, a starting characteristic information and removal of referencing is taken as a basis of a list and a function is iteratively analyzed until the characteristic information no longer change.

4. The method as claimed in claim 1, wherein all variables which have characteristic information determined are assigned present characteristic information; and wherein the method further comprises additionally inserting an instruction which stops execution of the instruction until the data is determined.

* * * * *